United States Patent
Colket, III

(10) Patent No.: US 7,444,820 B2
(45) Date of Patent: Nov. 4, 2008

(54) METHOD AND SYSTEM FOR RICH-LEAN CATALYTIC COMBUSTION

(75) Inventor: Meredith B. Colket, III, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 445 days.

(21) Appl. No.: 10/969,390

(22) Filed: Oct. 20, 2004

(65) Prior Publication Data

US 2006/0080967 A1 Apr. 20, 2006

(51) Int. Cl.
F02C 7/22 (2006.01)
F02C 7/26 (2006.01)

(52) U.S. Cl. ............... 60/777; 60/723; 431/268

(58) Field of Classification Search ........... 60/777, 60/723, 39.822; 431/7, 170, 268, 326–329
See application file for complete search history.

(56) References Cited

U.S. PATENT DOCUMENTS

| | | | | |
|---|---|---|---|---|
| 3,914,091 | A * | 10/1975 | Yamagishi et al. | 431/10 |
| 4,054,407 | A | 10/1977 | Carrubba et al. | |
| 4,354,821 | A * | 10/1982 | Kesselring et al. | 431/7 |
| 4,459,126 | A * | 7/1984 | Krill et al. | 431/7 |
| 5,165,224 | A * | 11/1992 | Spadaccini et al. | 60/780 |
| 5,183,401 | A | 2/1993 | Dalla Betta et al. | |
| 5,207,053 | A * | 5/1993 | Spadaccini et al. | 60/780 |
| 5,232,357 | A | 8/1993 | Dalla Betta et al. | |
| 5,235,804 | A * | 8/1993 | Colket et al. | 60/780 |
| 6,358,040 | B1 * | 3/2002 | Pfefferle et al. | 431/7 |
| 6,394,791 | B2 * | 5/2002 | Smith et al. | 431/170 |
| 6,752,623 | B2 * | 6/2004 | Smith et al. | 431/170 |
| 7,152,409 | B2 * | 12/2006 | Yee et al. | 60/777 |
| 2001/0046650 | A1 * | 11/2001 | Smith et al. | 431/170 |
| 2002/0197578 | A1 * | 12/2002 | Smith et al. | 431/170 |
| 2003/0056519 | A1 * | 3/2003 | Newburry | 60/777 |
| 2006/0064987 | A1 * | 3/2006 | Veninger | 60/777 |

FOREIGN PATENT DOCUMENTS

| | | |
|---|---|---|
| GB | 1460312 | 5/2007 |
| JP | 62-288420 | 12/1987 |
| JP | 07-500659 | 1/1995 |
| JP | 11-248160 | 9/1999 |
| JP | 2003-528283 | 9/2003 |
| RU | 2176052 | 11/2001 |
| RU | 2212590 | 9/2003 |
| WO | 9209849 | 6/1992 |
| WO | 0171252 | 9/2001 |

OTHER PUBLICATIONS

Lefebvre A., Gas Turbine Combustion, 1999, Taylor and Francis, Second Edition, p. 366.*
Japanese Office Action dated May 8, 2008.

* cited by examiner

Primary Examiner—William H Rodríguez
(74) Attorney, Agent, or Firm—Carlson, Gaskey & Olds

(57) ABSTRACT

A gas turbine engine using a rich-lean catalytic combustion system includes a rich catalytic burner and a lean catalytic burner. The rich catalytic burner includes a rich catalytic reactor and a heat exchanger. The rich catalytic reactor catalytically burns a fuel rich mixture to provide a heated fuel. The heat exchanger receives a stream of air that absorbs a portion of the heat from the catalytic burning of the fuel rich mixture to keep the reaction in the rich catalytic reactor at or below a threshold temperature. A resulting heated air from the heat exchanger and the heated fuel are mixed in a mixing zone to provide a heated fuel-air mixture. The lean catalytic burner receives and burns the heated fuel-air mixture.

25 Claims, 4 Drawing Sheets

METHOD AND SYSTEM FOR RICH-LEAN CATALYTIC COMBUSTION

FIELD OF THE DISCLOSURE

The present disclosure generally relates to methods and systems for combustion of hydrocarbon fuels, and more particularly, to a method and system for rich-lean catalytic combustion of hydrocarbon fuels.

BACKGROUND OF THE DISCLOSURE

Gas turbines must comply with ever increasing regulatory emissions standards while maintaining or optimizing performance and cost. Mandated emissions regulations to reduce oxides of nitrogen (NOx) are the main driving force behind the development of new and costly technologies involving premixed combustion, catalytic systems, and post combustion clean-up. To comply with emission standards, lean-burning catalytic systems have advanced significantly to provide a stable (dynamic-free) burn with low NOx emissions. However, such systems require preheating as the catalyst will not light at all combustor inlet temperatures. In aeroderivative and advanced cycle engines, the temperature of the combustor inlet at full power conditions (at or above 800° F.) may exceed catalyst light-off temperatures (about 700° F.). But even for these systems, the catalyst will not be operational at part power conditions. To preheat the gas to necessary inlet temperatures, a pre-burner is located upstream of the catalyst. This preburner can be the primary source of NOx emissions for lean-burn catalytic systems.

Furthermore, the use of lean-burn catalytic systems in advanced cycle engines that require high firing temperatures (above 2200° F.) is limited. In such cases, high flame speeds and temperatures lead to overheating of the catalyst bed and reduced product life.

Fuel-rich catalytic systems do not face the noted light-off problem as the fuel-rich catalysts are much more active at lower temperatures. However, the products of the fuel-rich reaction system must then be burned in a more conventional homogeneous environment, i.e., normal combustion, which produces NOx emissions. While overall NOx emissions with such systems are low relative to those within a more conventional gas turbine (e.g., 9-15 ppm), they still are on the order of 3 ppm. In some installations, post-combustion clean-up will still be required should local regulations mandate emissions levels below 3 ppm. Variation in combustor hardware, construction, location, and ambient conditions suggest that the 3 ppm emissions may not be attainable easily for the next generation of burners.

Therefore, there is a need for a system that resolves conflicts with the high light-off temperatures and the limitations to the high firing temperatures associated with use of the lean catalytic burners to provide near 1 ppm emissions without any drawbacks in performance or cost. Additionally, there is a need for a method for combustion of conventional fuels such as methane, natural gas, propane, home heating fuels, diesel fuel, and standard aircraft fuels in such a manner as to limit the formation of pollutants such as nitrogen oxides (NO+ NO2, together known as NOx).

SUMMARY

In accordance with one aspect of the present disclosure, a rich-lean catalytic combustion system includes a rich catalytic burner including a rich catalytic reactor and a heat exchanger, a mixing zone downstream of the rich catalytic burner, and a lean catalytic burner downstream of the mixing zone.

In accordance with another aspect of the present disclosure, a method of combustion includes premixing a fuel and a first air stream to provide a fuel rich mixture and catalytically burning the fuel rich mixture in a rich catalytic reactor, the burning producing a heated fuel and generating heat. This heated fuel includes any one or more of unburned or partially burned hydrocarbons, $H_2$, CO, $H_2O$, $CO_2$ and $N_2$. The disclosed method of combustion further includes supplying a heat exchanger with the second air stream, the heat exchanger absorbing the heat generated by the rich catalytic reactor to provide heated air, and mixing the heated fuel with the heated air in a mixing zone to provide a heated fuel-air mixture. The method also includes catalytically burning the heated fuel-air mixture in a lean catalytic burner.

In accordance with yet another aspect of the present disclosure, a method of combustion includes catalytically burning a fuel rich fuel-air mixture to provide heated fuel, the catalytically burning causing heating of a stream of air to provide heated air, and mixing heated air with the heated fuel to provide a heated fuel-air mixture. The disclosed method further includes catalytically burning the heated fuel-air mixture, and combusting the catalytically burned lean fuel and air mixture.

In accordance with a fourth aspect of the present disclosure, a method of combustion includes catalytically burning a fuel rich fuel-air mixture to provide heated fuel, the catalytically burning causing heating of a non-combustible mixture of air and fuel to provide a non combustible fuel-air mixture, and mixing non-combustible fuel-air mixture with the heated fuel to provide a heated fuel-air mixture. The disclosed method further includes catalytically burning the heated fuel-air mixture, and combusting the heated fuel-air mixture.

These and other aspects and features of the disclosure will be more readily understood upon reading the following detailed description when taken in conjunction with the accompanying drawing.

Figure 1:
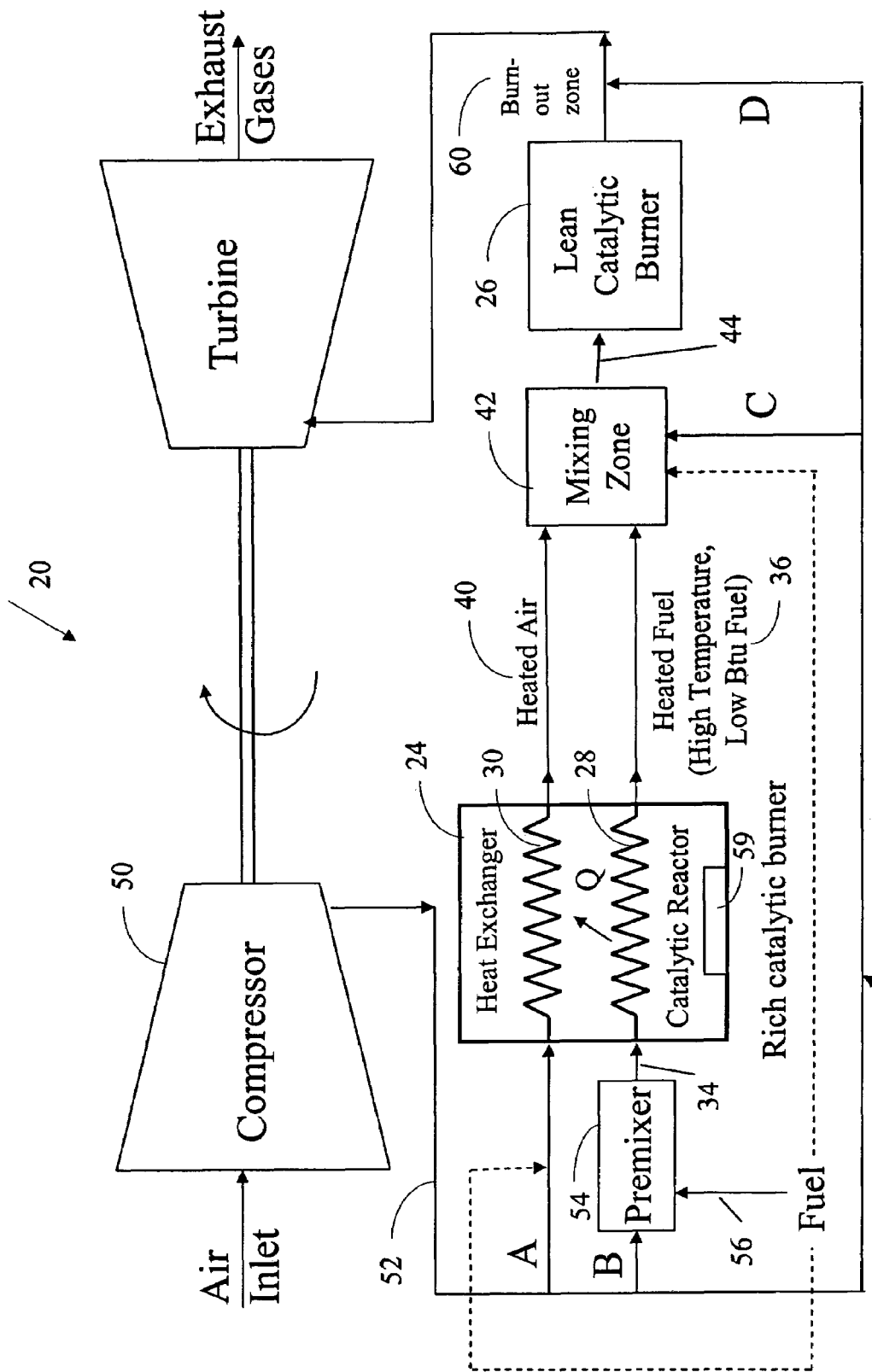
FIG. 1 is a schematic diagram of a gas turbine engine illustrating the method and system for rich-lean catalytic combustion in accordance with the teachings of the present disclosure.

While the following disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

DETAILED DESCRIPTION

Referring to the FIG. 1, a gas turbine engine 20 using a rich-lean catalytic combustion system 22 constructed in accordance with the teachings of the present disclosure is schematically shown. The combustion system 22 includes a rich catalytic burner 24 and a lean catalytic burner 26. The rich catalytic burner 24 includes a rich catalytic reactor 28 and a heat exchanger 30. The rich catalytic reactor 28 burns a fuel rich mixture 34 to provide heated fuel 36. The heat exchanger 30 receives an air stream A that absorbs the heat from the catalytic burning of the fuel rich mixture 34 to keep the reaction in the rich catalytic reactor 28 at or below a catalytic reaction threshold temperature. Resulting heated air 40 from the heat exchanger 30 and the heated fuel 36 are mixed in a mixing zone 42 to provide a heated fuel-air mixture 44. The lean catalytic burner 26 receives and burns the heated fuel-air mixture 44. The combination of the rich catalytic burner 24 in front of the lean catalytic burner 26 provides a low NOx emission when used in any burner.

The gas turbine engine 20 includes a compressor 50 that receives outside air from an inlet (not shown) and provides a stream of compressed air 52 for combustion. The stream of compressed air 52 is split into the air stream A and an air stream B. The air stream A is provided to the heat exchanger 30, while the air stream B is provided to a pre-mixer 54. The pre-mixer 54 mixes the air stream B with fuel 56 to produce the fuel rich mixture 34. The stream A includes a larger portion of the stream of compressed air 52 than the air stream B. The amount of the air stream B that is mixed with the fuel 56 can be between 5% to 35% of the stream of compressed air 52. In any application of this technology to pilots, the percentage of the compressor flow allocated to provide the fuel rich mixture 34 can be scaled proportionally. Also, the quantity of the air stream B that is added to the fuel 56 can be determined to provide the fuel rich mixture 34. One of ordinary skill in the art will readily recognize that a fuel rich mixture includes any mixture having a fuel to air ratio that is greater than a fuel to air ratio needed to achieve a stoichiometric combustion.

The fuel rich mixture 34 is provided to the rich catalytic reactor 28, where it is partially burned in a catalytic process to provide the heated fuel 36. The rich catalytic reactor 28 is well known to those of ordinary skill in the art and can typically include a plurality of passages (not shown) disposed in a housing (not shown). A number of connected tubes (not shown) may form the passages, or alternately, the passages may be formed by spaces between a number of plates and fins (not shown) that are arranged in the housing. All or portions of the passages may be coated with a catalyst that comes into contact with the fuel rich mixture 34 when passing through the passages. The catalyst can be rhodium, alone or in combination with any one of the other metals in the platinum family, such as platinum, palladium, iridium, and ruthenium. Alternatively, the active ingredient for the catalyst may base metals, metal oxides, or any combination thereof. Specific examples include lanthanum, copper, nickel, zirconium, vanadium, osmium, chromium, iron, cobalt, copper, titanium and manganese. One of ordinary skill in the art will appreciate that the use of rhodium with the fuel rich mixture 34 may provide initiating oxidation of the fuel rich mixture 34 without any heat or heat source beyond that available from the compressor air 52. However, the use of other catalysts and catalyst/substrates are possible as long as the catalysts can sustain oxidation and partial oxidation of fuel rich mixtures without any additional heat from combustion or any heat from an alternate heat source. The catalyst make-up may be tailored to achieve larger amounts of heat release by preferably forming $CO_2$ or $H_2O$ or a smaller heat release by preferably forming $H_2$ and $CO$. During initial start-up, the rich catalytic burner 24 may need temporary heating either through resistive heating 59 or a small pre-burner 59. However, the fuel-rich catalytic burning in the rich catalytic burner 24 should be self-sustaining once lit, even when implemented in other combustion systems.

The fuel rich mixture 34 is partially oxidized in the rich catalytic reactor 28 to generate the heated fuel 36. The heat from the catalytic burning of the fuel rich mixture 34 in the rich catalytic reactor 28 is controlled by being absorbed by the air stream A through the heat exchanger 30. Accordingly, the heat exchanger 30 keeps the catalytic reaction in the rich catalytic reactor 28 at or below the catalytic threshold temperature above which the catalyst durability or lifetime is limited. Thus, the air stream A exits the heat exchanger 30 as the heated air 40.

Figure 2:
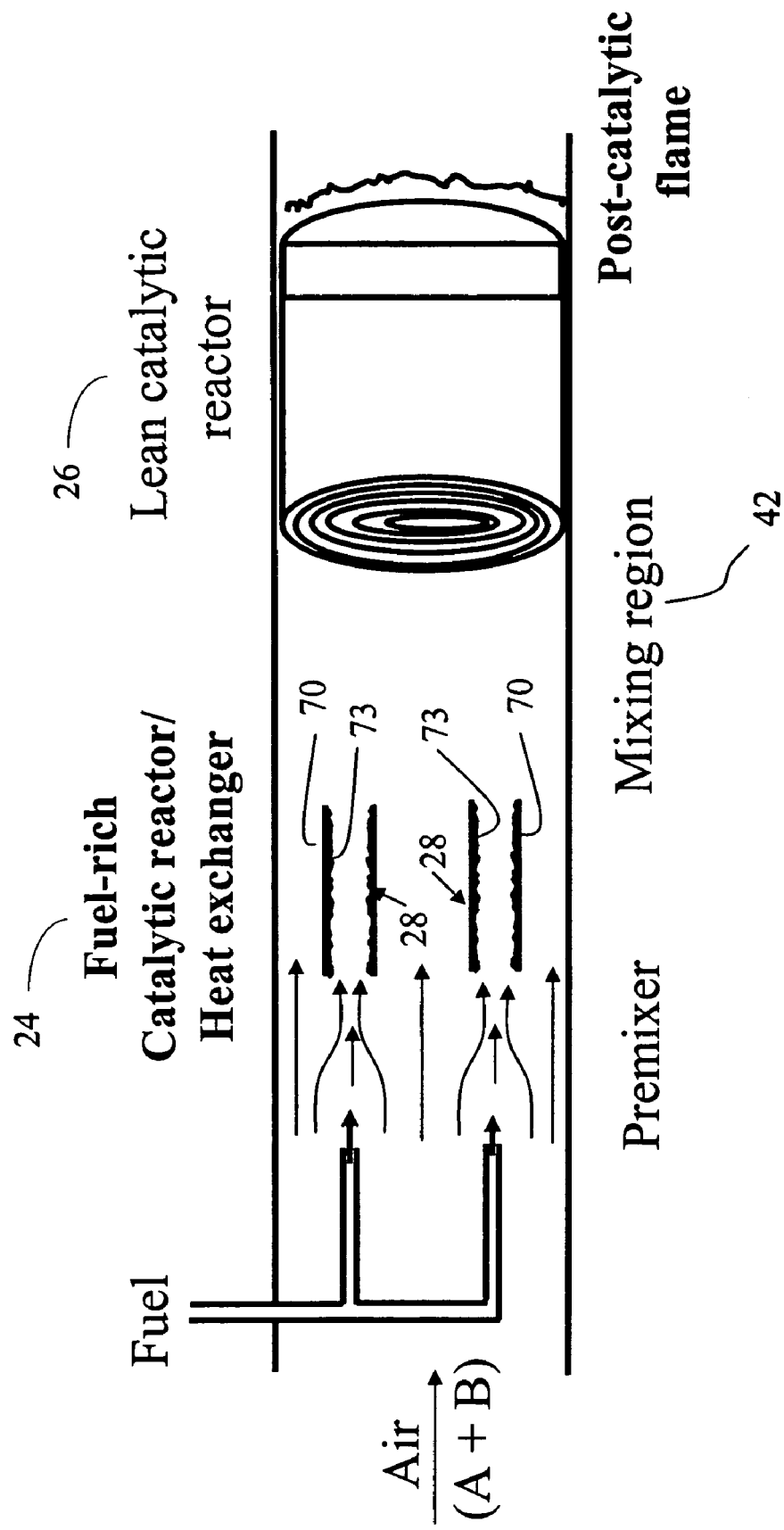
FIG. 2 is a schematic diagram of a method and system for rich-lean catalytic combustion in accordance with the teachings of an example of the present disclosure.

The heat exchanger 30 is part of the rich catalytic burner 24 and the construction thereof is well known to those of ordinary skill in the art. For example, as shown schematically in FIG. 2, the rich catalytic reactor 28 can include a number of tubes 70 that are heat conductive. The fuel rich mixture 34 flows through the tubes 70, in which a catalytic material 73 is disposed. Accordingly, the disclosed fuel rich catalytic reaction occurs in the tubes 70. The air stream A to which additional fuel may be added can then pass between the tubes and surrounding each tube 70 to absorb the heat conducted through the tubes 70. With the additional fuel that may be added to air stream A, however, air stream A can provide a non-combustible fuel-air mixture. The tubes 70 may simply be a number of passageways that are formed by plates, fins, or the like, which are typical of conventional heat exchanger designs known to those of ordinary skill in the art.

Figure 3:
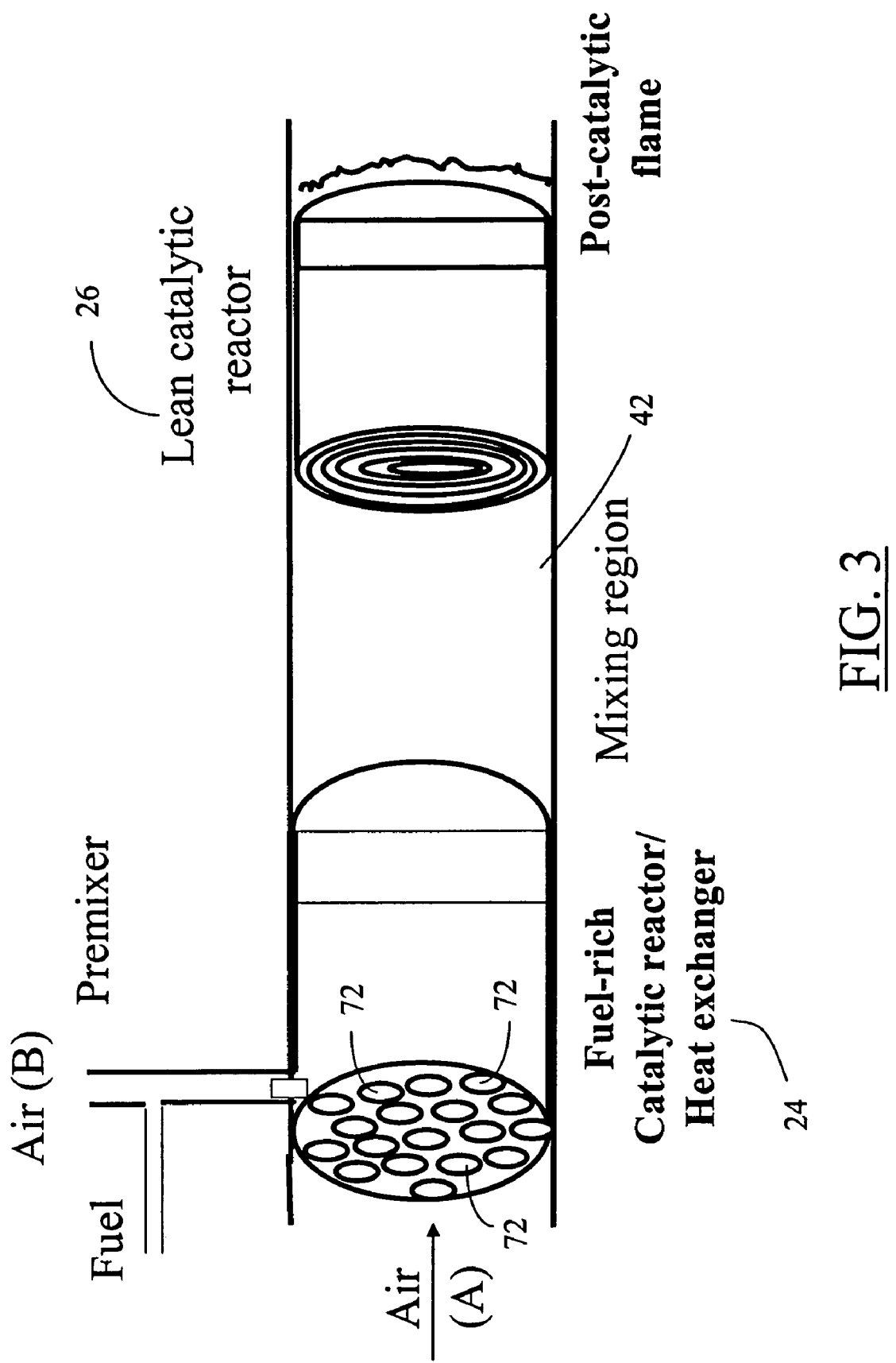
FIG. 3 is a schematic diagram of a method and system for rich-lean catalytic combustion in accordance with the teachings of an alternate example of the present disclosure.

In another example, as schematically shown in FIG. 3, the air stream A can pass through a number of heat conductive tubes 72, while the outside of the tubes 72 can include a catalytic material (not shown) by which the catalytic reaction is triggered. The fuel rich mixture 34 passes in between and surrounding the tubes 72, wherein the disclosed fuel rich catalytic reaction occurs. Accordingly, the air stream A passing through the tubes 72 absorbs the heat conducted through the tubes 72. An example of a rich catalytic burner as schematically shown in FIG. 3 is disclosed in U.S. Pat. No. 6,358,040.

In yet another example (not shown), the rich catalytic reactor 28 can include a plurality of passages in a housing. The passages may be formed by spaces between a number of plates and fins that are arranged in the housing. The plates and/or fins may be parallel to define passages in which the fuel-rich mixture 34 can flow. All or portions of the passages may be coated with the catalytic material 73, which comes into contact with the fuel-rich mixture 34 when passing through the passages. The walls of the passages can be in contact with the air stream A to provide the above-described heat-exchanger function. One of ordinary skill in the art will readily appreciate that numerous designs and structures for the rich catalytic reactor 28 can be adopted to perform the above-described catalytic reaction.

The heated air 40 and the heated fuel 36 are combined and mixed in a mixing zone 42 to provide the heated fuel-air mixture 44. The mixing zone 42 may also receive additional air from the compressed air 52 through an air stream C, which is a part of the compressed air 52. When additional air is supplied to the mixing region 42 from the air stream C, all, some or none of the heated air 40 can bypass the mixing zone 42 and the lean catalytic burner 26. Additionally, an air stream D, which is part of the compressed air 52, can be used for cooling of the above-described components by methods that are known to those of ordinary skill in the art. The relative amounts of air streams A, C, and D may be optimized to meet emissions regulations or cooling requirements for the combustor liner of the catalyst.

The heated fuel-air mixture 44 is provided to the lean catalytic burner 26, in which the heated fuel-air mixture 44 is catalytically burned. A high degree of mixing of the heated fuel 36 and the heated air 40 may be required to avoid non-uniform heating in the lean catalytic burner 26. For example, small physical scales positioned at the exit of the fuel-rich catalytic reactor 28 can promote good mixing. The mixture entering the lean catalytic burner 26 can be mixed to an average fuel-air ratio varying less than plus or minus 5% of that value throughout the spatial domain. The lean catalytic burner 26 can typically include a series of passages (not shown) that are coated with palladium oxide/palladium or other platinum based metals as described in the foregoing. Palladium oxide/palladium based systems are preferred for lean catalytic systems, although any of a variety of catalytic materials can be used for this stage. Non-uniform coating of passages with passage-to-passage or axial variations can be utilized to control the rate of heat released in the rich or lean catalytic reactors. An example of a lean catalytic burner that can be used in the disclosed combustion system 22 and method is disclosed in U.S. Pat. No. 5,232,357. The combustion process may be completed by having a homogenous combustion process in a combustion region 60 downstream of the lean catalytic burner 26 that is not conducive to NOx formation.

Figure 4:
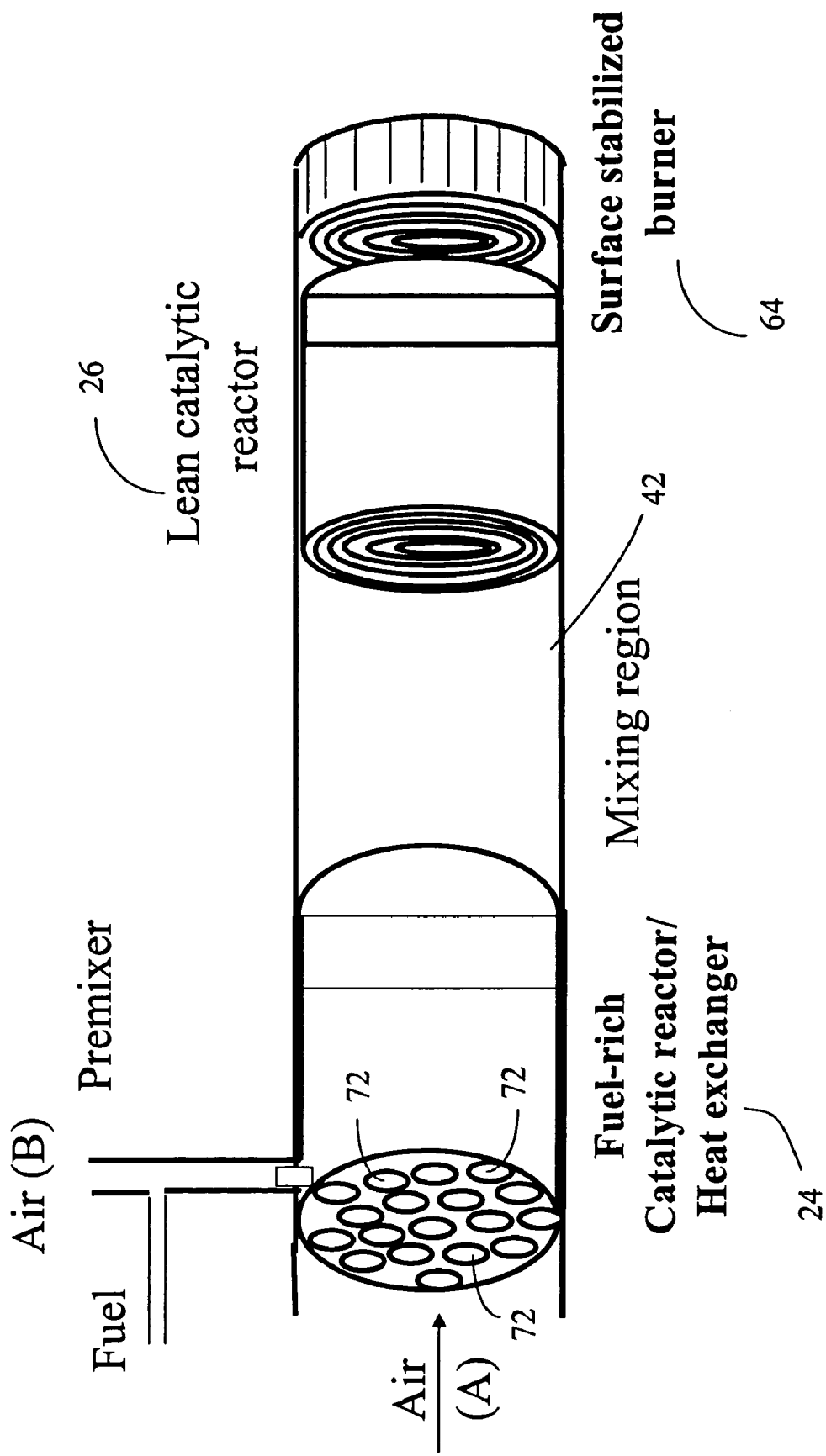
FIG. 4 is the schematic diagram of FIG. 3, showing the surface stabilized burner downstream of the catalytic system constructed in accordance with the teachings of the present disclosure.

Referring to FIG. 4, because lean catalytic systems may be susceptible to flashback and subsequent catastrophic destruction, a surface stabilized burner, such as a ceramic-based structure 62, which is known to those of ordinary skill in the art, can be placed downstream of the lean catalytic burner 26 to provide surface stabilization of the downstream combustion processes and reduce the potential for flashback. The surface stabilized burner or the ceramic-based structure 62 completes the combustion process and can minimize CO emissions. The ceramic material of the ceramic-based structure 62 may be Silicon Carbide (SiC) or any other high temperature ceramic material and may be coated with any of a variety of thermal barrier coatings known to persons of ordinary skill in the art. The ceramic-based structure 62 can be constructed using a porous fiber combustion surface, such as that disclosed in U.S. Pat. No. 6,453,672, or may be constructed with a set of parallel walls (planar or tubular) that are composed of high temperature ceramic materials. Preferably, the ceramic-based structure 62 is integral to the exit of the lean catalytic burner 26 so as to act as a flame arrestor and prevent flashback into the lean catalytic burner 26.

In FIG. 1, all of the fuel 56 is shown to be added to the air stream B in the pre-mixer 54. Alternately, as shown by a dashed line in FIG. 1, some of the fuel may be added either to the air stream A or the air stream C to enable a broader range of operation as the gas turbine engine 20 transitions between partial power and full power conditioning or to limit the propensity for flashback or ignition in the premixing region. Addition of some fuel into air stream A will reduce constraints associated with the high quality of premixing needed for the lean catalytic burner 26. The amount of fuel to be added into air stream A or C may system and power-level dependent and may be additionally based upon trade-offs between light-off temperatures, ignition conditions and pre-mixing requirements.

The disclosed method is not limited to gas turbine applications. This method can be applied to any type of combustion system that may require low NOx emissions. Such combustion systems may include industrial, commercial and residential furnaces. Additionally, the disclosed system 22 and method is not restricted to the use of a particular type of fuel. For example, the fuel 56 may be methane, natural gas, propane, $H_2$ based fuels, and any of a variety of liquid hydrocarbon-based fuels, including methanol, ethanol, kerosene, gasoline, diesel, home heating oil, and aircraft fuels. The disclosed system 22 and method can also be used as a low NOx pilot or flame stabilization system for a main burner in any of the above-noted systems.

The catalytic burning in the rich catalytic burner 24 preheats the fuel rich mixture 34 for the catalytic reaction in the lean catalytic burner 26. Accordingly, the rich catalytic burner 24 can be sized as deemed appropriate by one of ordinary skill in the art, for example to ensure sufficient heat release to preheat the fuel rich mixture 34 for the lean burn in the lean catalytic burner 26 while at the same time minimizing manufacturing costs and pressure losses in the system. Additionally, the rich catalytic burner 24 serves as a pilot for the lean catalytic burner 26, hence all or a portion of the fuel may be directed to the rich catalytic burner 24. Combustion can then be completed downstream of the lean catalytic burner 26 via the surface stabilized ceramic-based structure 62 or by homogeneous reactions.

The catalytic materials and the length of the rich catalytic burner 24 can be tailored so that the heated fuel 36 includes primarily stable products such as $CO_2$ and $H_2O$ with large heat release. The catalytic materials and the length of the rich catalytic burner 24 can also be tailored so that the heated fuel 36 includes more reactive products such as $H_2$ and CO, which have a lower light-off temperature for the subsequent lean catalytic burner 26. Accordingly, by forming more reactive products such as $H_2$ and CO, the light-off temperature is shifted lower for a broad range of operation. Thus, the catalytic materials can be tailored for each application, depending on trade-offs between ignition delay, flashback, and the effect of temperature vs. species (i.e., by products of the reaction) on the light-off condition of the lean catalytic burner 26.

Persons of ordinary skill in the art will appreciate that, although the teachings of the present disclosure have been illustrated in connection with certain examples, there is no intent to limit the present disclosure to such examples. On the contrary, the intention of this application is to cover all modifications and examples fairly falling within the scope of the teachings of the present disclosure.

What is claimed is:

1. A rich-lean catalytic combustion system, comprising:
a rich catalytic burner including a rich catalytic reactor and a heat exchanger;
a mixing zone downstream of the rich catalytic burner;
a lean catalytic burner downstream of the mixing zone; and
a compressor adapted to supply air to a pre-mixer and the heat exchanger, and a turbine downstream of the lean catalytic burner.

2. The combustion system of claim 1, wherein any one of the rich catalytic reactor and lean catalytic reactor includes a catalyst having an active ingredient comprising a base metal.

3. The combustion system of claim 1, wherein any one of the rich catalytic reactor and the lean catalytic reactor includes a catalyst having an active ingredient comprising a metal oxide.

4. The combustion system of claim 1, the rich catalytic reactor comprising any or a combination of metals from the platinum family of metals.

5. The combustion system of claim 4, the rich catalytic reactor comprising rhodium.

6. The combustion system of claim 1, the lean catalytic burner comprising any or a combination of metals from the platinum family of metals.

7. The combustion system of claim 6, the lean catalytic burner comprising palladium oxide.

8. The combustion system of claim 1, further comprising a combustion region downstream of the lean catalytic burner.

9. The combustion system of claim 1, wherein the rich catalytic burner comprises a heater.

10. The combustion system of claim 1, further comprising a surface-stabilized combustion region downstream of the lean catalytic burner.

11. The combustion system of claim 1, wherein said lean catalytic burner includes at least a lean catalytic reactor and a catalyst.

12. A rich-lean catalytic combustion system, comprising:
a rich catalytic burner including a rich catalytic reactor and a heat exchanger;
a mixing zone downstream of the rich catalytic burner;
a lean catalytic burner downstream of the mixing zone; and
a pre-mixer upstream of the rich catalytic burner, the pre-mixer adapted to supply the rich catalytic reactor with a fuel rich mixture.

13. A rich-lean catalytic combustion system, comprising:
a rich catalytic burner including a rich catalytic reactor and a heat exchanger;
a mixing zone downstream of the rich catalytic burner:
a lean catalytic burner downstream of the mixing zone:
a surface-stabilized combustion region downstream of the lean catalytic burner; and
the surface-stabilized combustion region including a high temperature ceramic-based structure.

14. A method of combustion comprising:
premixing a fuel and a first air stream to provide a fuel rich mixture;
catalytically burning the fuel rich mixture in a rich catalytic reactor, the burning producing heated fuel and generating heat;
supplying a heat exchanger with a second air stream, the heat exchanger absorbing the heat generated by the rich catalytic reactor and heating the second air stream to provide heated air;
mixing the heated fuel with the heated air in a mixing zone to provide a heated fuel-air mixture;
catalytically burning the heated fuel-air mixture in a lean catalytic burner; and
the step of catalytically burning the fuel rich mixture including initiating the burning of the fuel rich mixture by a heater.

15. The method of claim 14, wherein the mixing comprises adding fuel to the heated fuel-air mixture.

16. The method of claim 14, wherein the mixing comprises adding air to the heated fuel-air mixture.

17. The method of claim 14, further comprising combusting the heated fuel-air mixture in a combustion region after catalytically burning the heated fuel-air mixture.

18. The method of claim 14, further comprising providing a third air stream for component cooling.

19. A method of combustion comprising:
premixing a fuel and a first air stream to provide a fuel rich mixture;
catalytically burning the fuel rich mixture in a rich catalytic reactor, the burning producing heated fuel and generating heat;
supplying a heat exchanger with a second air stream, the heat exchanger absorbing the heat generated by the rich catalytic reactor and heating the second air stream to provide heated air;
mixing the heated fuel with the heated air in a mixing zone to provide a heated fuel-air mixture;
catalytically burning the heated fuel-air mixture in a lean catalytic burner; and
adding fuel to the second air stream before heating the second air stream.

20. A method of combustion comprising:
premixing a fuel and a first air stream to provide a fuel rich mixture;
catalytically burning the fuel rich mixture in a rich catalytic reactor, the burning producing heated fuel and generating heat;
supplying a heat exchanger with a second air stream, the heat exchanger absorbing the heat generated by the rich catalytic reactor and heating the second air stream to provide heated air;
mixing the heated fuel with the heated air in a mixing zone to provide a heated fuel-air mixture;
catalytically burning the heated fuel-air mixture in a lean catalytic burner;
combusting the heated fuel-air mixture in a combustion region after catalytically burning the heated fuel-air mixture; and
stabilizing the combusting of the heated fuel-air mixture in the combustion region with a high temperature ceramic-based structure.

21. A method of combustion, comprising:
catalytically burning a fuel rich fuel-air mixture to provide a heated fuel, the catalytically burning causing heating of a non-combustible mixture of air and fuel to provide a heated non-combustible fuel-air mixture;
mixing the non-combustible fuel-air mixture with the heated fuel to provide a heated fuel-air mixture;
catalytically burning the heated fuel-air mixture;
combusting the catalytically burned heated fuel-air mixture in a combustion region;
initiating the burning of the fuel rich fuel-air mixture by a heater; and
the mixing comprises adding fuel to the heated fuel-air mixture.

22. The method of claim 21, wherein the mixing comprises adding air to the heated fuel-air mixture.

23. The method as set forth in claim 21, further including the steps of providing a rich catalytic reactor, a heat exchanger, a mixing zone, and a lean catalytic burner to achieve the catalytically burning, mixing and combusting steps.

24. A method of combustion, comprising:
catalytically burning a fuel rich fuel-air mixture to provide a heated fuel, the catalytically burning causing heating of a non-combustible mixture of air and fuel to provide a heated non-combustible fuel-air mixture;
mixing the non-combustible fuel-air mixture with the heated fuel to provide a heated fuel-air mixture;
catalytically burning the heated fuel-air mixture;
combusting the catalytically burned heated fuel-air mixture in a combustion region; and
stabilizing the combusting of the heated fuel-air mixture in the combustion region with a high temperature ceramic-based structure.

25. A method of combustion, comprising:
catalytically burning a fuel rich fuel-air mixture to provide a heated fuel, the catalytically burning causing heating of a non-combustible mixture of air and fuel to provide a heated non-combustible fuel-air mixture;
mixing the non-combustible fuel-air mixture with the heated fuel to provide a heated fuel-air mixture;
catalytically burning the heated fuel-air mixture;
combusting the catalytically burned heated fuel-air mixture in a combustion region; initiating the burning of the fuel rich fuel-air mixture by a heater; and
providing a cooling air stream for component cooling.

* * * * *